(12) United States Patent
Todani

(10) Patent No.: US 6,754,011 B2
(45) Date of Patent: Jun. 22, 2004

(54) HIGH ZOOM RATIO LENS

(75) Inventor: Satoshi Todani, Saitama (JP)

(73) Assignee: Tamron Co., Ltd., Saitama-ken (JP)

( * ) Notice: Subject to any disclaimer, the term of this patent is extended or adjusted under 35 U.S.C. 154(b) by 0 days.

(21) Appl. No.: 10/376,601

(22) Filed: Mar. 3, 2003

(65) Prior Publication Data

US 2003/0179467 A1 Sep. 25, 2003

(30) Foreign Application Priority Data

Mar. 20, 2002 (JP) ........................................ 2002-078954

(51) Int. Cl.$^7$ ............................. G02B 15/14; G02B 7/02
(52) U.S. Cl. ....................... 359/699; 359/700; 359/701
(58) Field of Search ........................ 359/694, 699–701

(56) References Cited

U.S. PATENT DOCUMENTS 6,567,221 B2    5/2003   Todani ....................... 359/699

FOREIGN PATENT DOCUMENTS

| JP | H08-304684 | 11/1996 | ............ G02B/7/04 |
| JP | 2000089086 A | 3/2000 | |
| JP | 2002311322 A | 10/2002 | ............ G02B/7/02 |

Primary Examiner—Georgia Epps
Assistant Examiner—M. Hasan
(74) Attorney, Agent, or Firm—Jacobson Holman PLLC

(57) ABSTRACT

A high zoom ratio lens with a reduced number of barrel components or elements of a telescopic barrel having a light-weight outermost diameter. The zoom lens comprises first to fourth groups of lenses, a fixed barrel, a first cam barrel inside the fixed barrel, a linear barrel inside the first cam barrel, a focusing cam inside the linear barrel, and a second cam barrel outside the fixed barrel and rotatably connected to the first cam barrel. The first group of lenses move for zooming by a second—A cam in the linear barrel, and either third or fourth group of lenses move for zooming by a cam in the first cam barrel. The second group lenses move for focusing by a second—B cam in the focusing cam.

5 Claims, 6 Drawing Sheets

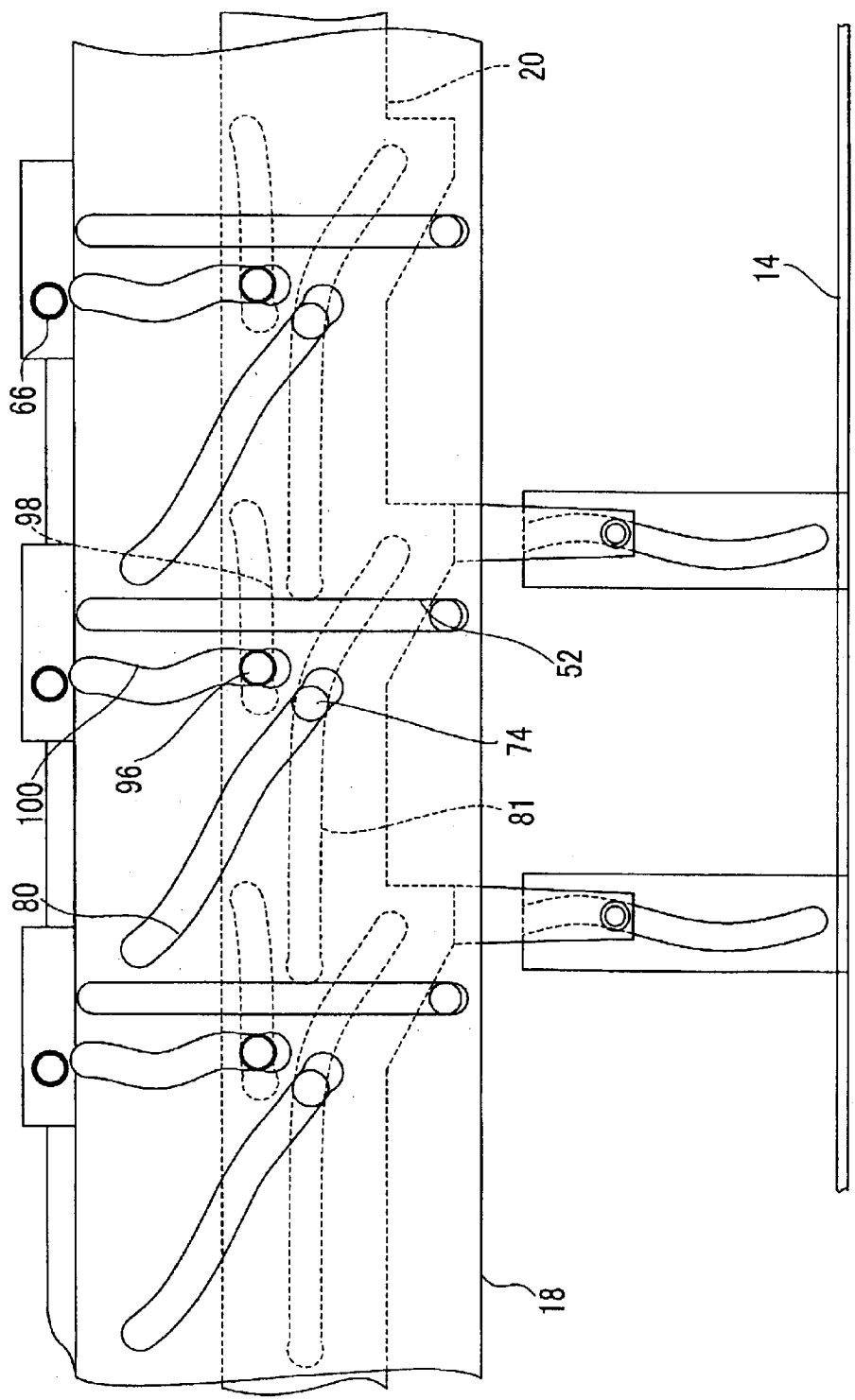

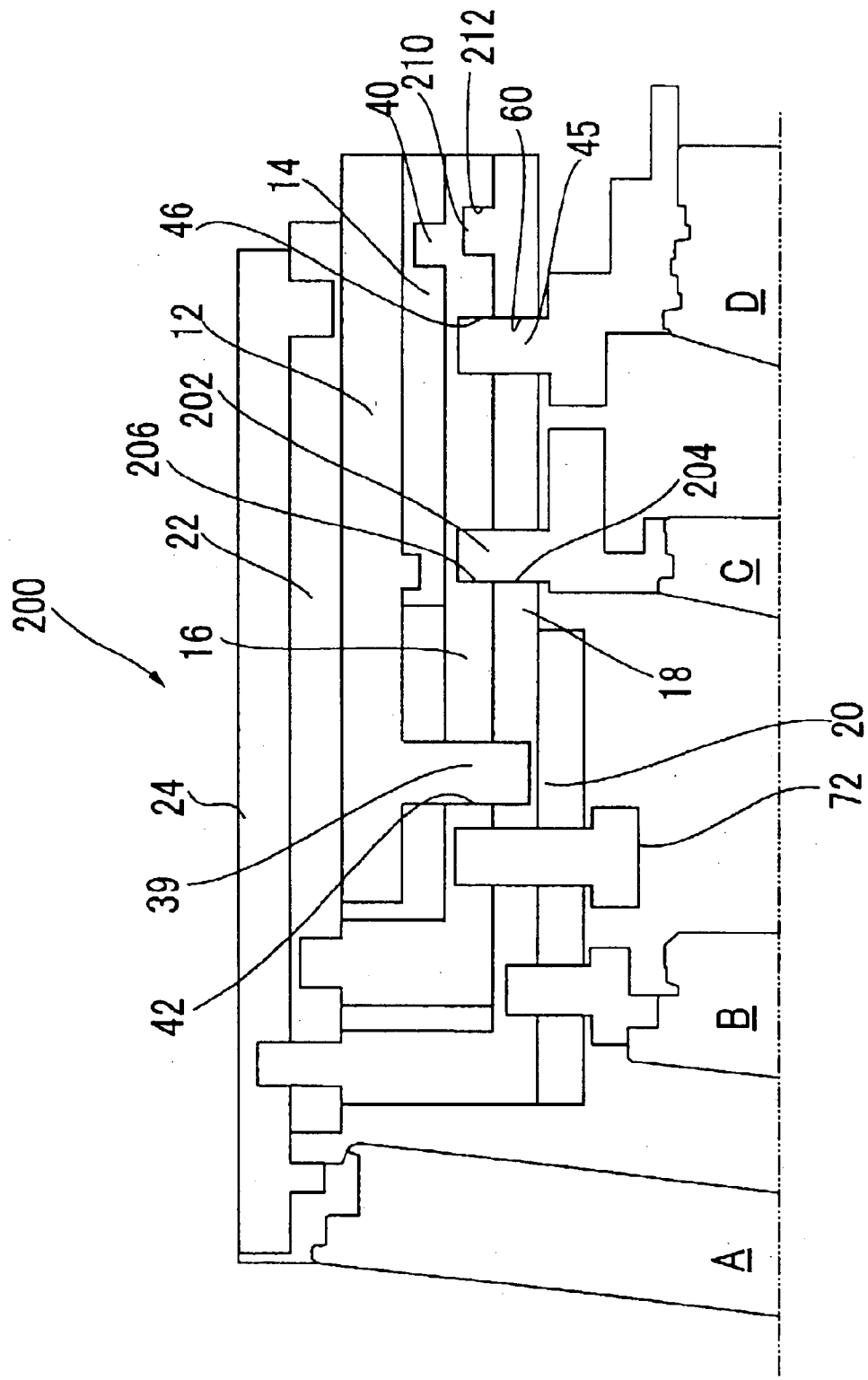

HIGH ZOOM RATIO LENS

FIELD OF THE INVENTION

The present invention relates to an inner-focusing high zoom ratio lens, and more particularly, it relates to a down-sized light-weighted high zoom ratio lens having barrel components reduced in number.

BACKGROUND ART

A prior art inner-focusing high zoom ratio lens has a greater variation in displacement of a focusing lens for focusing to a near point, and because a single focusing cam is insufficient to magnify a satisfactory near-focusing performance for a entire zoom range, a displacement for focusing becomes resultantly increased in the remaining zoom ranges, which leads to a necessity for vari-focal feature. Focusing cam curves used to shift a point of such vari-focal operation to the zoom range require appropriate balance of parameters of zooming and focusing. However, it is difficult to ensure a well-balanced cam configuration to attain smooth zooming and focusing, and hence, a rotation angle of a focusing cam must be altered, or some compensation with the focusing cam is required.

Japanese Patent Laid-Open No. H08-304684 discloses a high zoom ratio lens in which a focusing lens reciprocally moves, forward and backward, while almost simultaneously moving in a circumferential direction during either zooming or focusing. A cam arrangement is used for a guide groove that urges a focusing cam barrel to circumferentially move while a cam pin fitted in the guide groove slides therein along in the focusing cam barrel, so that a displacement in a circumferential direction distorts an operational range with the focusing cam during zooming so as to attain an appropriate adjustment of lens displacement in any of the zoom ranges for focusing.

However, it is still troublesome to ensure a sufficient displacement to magnify a near-focusing performance and to attain a displacement for focusing under a restricted condition of shift of focal point in the entire zoom range.

Additionally, in the high zoom ratio lens disclosed in Japanese Patent Laid-Open No. H08-304684, barrel components are assembled in a telescopic multi-layered barrel structure in which a first cam barrel is disposed inside a fixed barrel while a second cam barrel, a linear barrel, and a third cam barrel are positioned outside the same, and hence, there arises a problem that an outer diameter of the barrel assembly cannot be reduced.

In a high zoom ratio lens disclosed in Japanese Patent Laid-Open No. 2000-89086, a focus compensating cam is provided in a rotational member along with a focusing cam in order to attain an appropriate displacement to focus. However, since a focus lens in such mechanism is designed to linearly move during zooming, a displacement is fixed in any zoom range, and a sufficient displacement for compensation cannot be ensured to shorten a the distance to the nearest focusing point in any zoom range of the high zoom ratio lens.

Also, in the high zoom ratio lens disclosed in Japanese Patent Laid-Open No. 2000-89086, the barrel components are assembled in a five-layer structure where first and second cam barrels, a linear barrel, and a third cam barrel are telescopically deployed outside a fixed barrel, which leads to a problem that an outer diameter of the barrel assembly cannot be reduced.

The present invention is made to overcome the above-mentioned disadvantages in the prior art inner-focusing zoom lens. Accordingly, it is an object of the present invention to provide a high zoom ratio lens that is configured to reduce the number of required barrel components, or namely, the number of required layers of a telescopic barrel assembly, whereby an outer diameter of the barrel assembly can be decreased to make the barrel assembly light-weighted.

It is another object of the present invention to provide a high zoom ratio lens that is configured to reduce a longitudinal dimension of the barrel assembly when it is compacted the most or when a camera is out of use, so that a first one of groups of lenses can be shifted in a relatively greater forward stride.

It is still another object of the present invention to provide a high zoom ratio lens that can further reduce a minimum close-up distance from a front-end lens to an object.

SUMMARY OF THE INVENTION

The invention is directed to provide a high zoom ratio lens that is comprised of four groups of lenses, a fixed barrel, a first cam barrel disposed inside the fixed barrel, a linear barrel disposed inside the first cam barrel, a focusing cam disposed inside the linear barrel, and a second cam barrel disposed outside the fixed barrel and rotatably connected to the first cam barrel.

A first one of the groups of lenses are moved for zooming by means of a first cam provided in the second cam barrel, a second one of the groups of lenses serving as a focusing lens are moved for zooming by means of a second—A cam provided in the linear barrel, and one of third and fourth ones of the groups of lenses are moved for zooming by means of a cam provided in the first cam barrel.

Furthermore, the second group of lenses are moved for focusing by means of a second—B cam provided in the focusing cam.

The linear barrel is moved for zooming by means of a guide pin provided in the first cam barrel, the third group of lenses are fixed to the linear barrel, and the fourth group of lenses are moved for zooming by means of a fourth cam provided in the first cam barrel. Configured in this way, the high zoom ratio lens of the present invention advantageously has the reduced number of components and resultantly has a simplified arrangement. Both the third and fourth groups of lenses are moved for zooming respectively by means of third and fourth cams provided in the first cam barrel. With this configuration, a freedom in designing optical system is enlarged, and zooming and focusing can be performed with higher accuracies.

The second group of lenses are moved for focusing by engagement of the second—A cam in the linear cam with the second—B cam in the focusing cam. With a configuration in this manner, a compensation of cam groove in the second cam can be facilitated.

A displacement of the linear barrel during the zooming is reduced down to 40% to 60% of a displacement of the first group of lenses for zooming. Configured in this way, outer dimensions of the barrel assembly longitudinally compacted the most while a camera is out of use, for example, can be most effectively exploited; that is, the first group of lenses can be shifted to the front end position among others.

BRIEF DESCRIPTION OF THE DRAWINGS

A best mode for implementing the present invention will be described in detail in conjunction with the accompanying drawings, and like reference numerals denote similar components throughout the drawings in which

FIG. 5 is an exploded view of the focusing mechanism, showing the first embodiment of the high zoom ratio lens in the zoom-tele mode; and FIG. 6 is a cross sectional view illustrating a second embodiment of the high zoom ratio lens.

DETAILED DESCRIPTION OF THE INVENTION

Best Mode of the Preferred Embodiment

Embodiment 1

Figure 1:
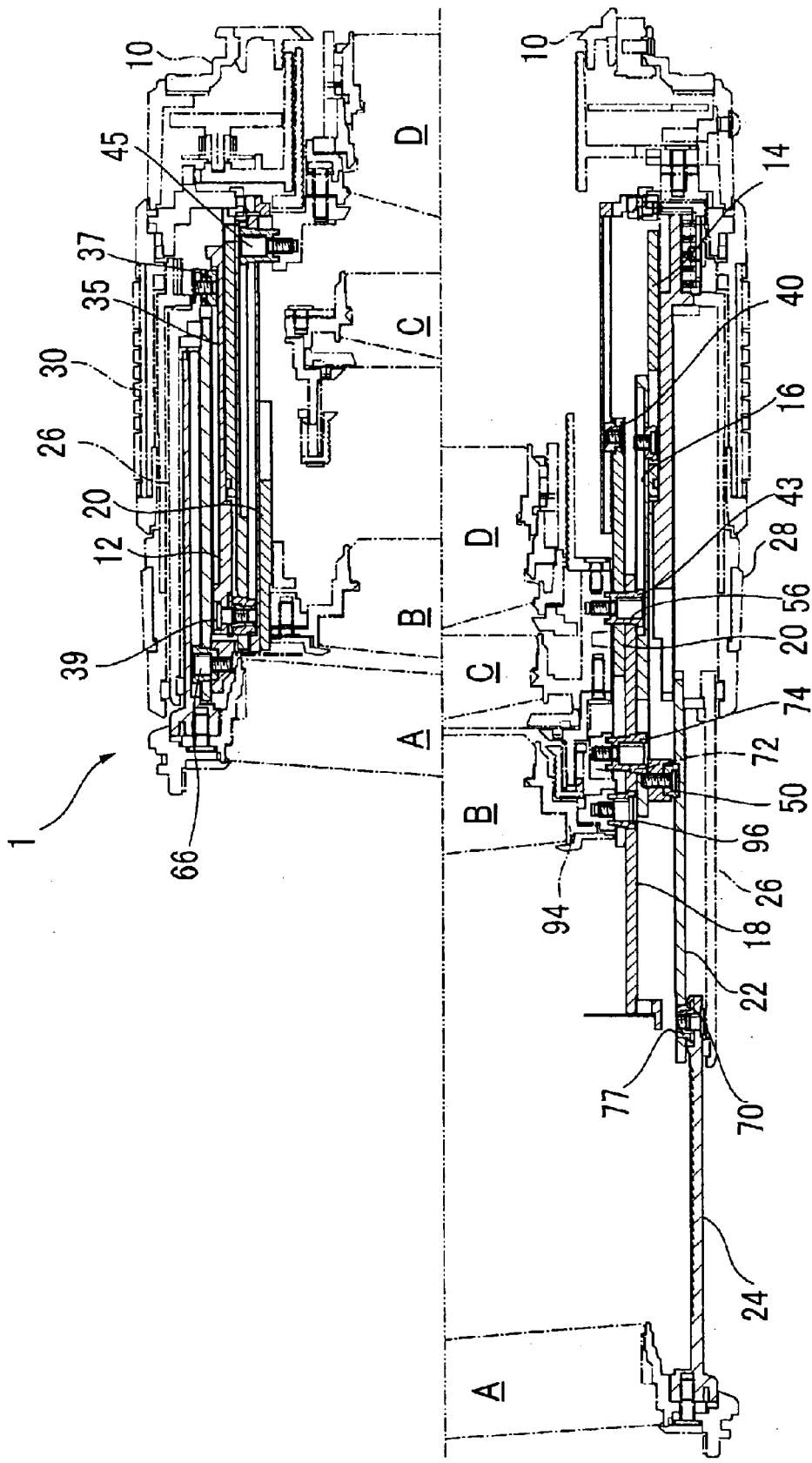
FIG. 1 is a sectional view of a first embodiment of a high zoom ratio lens according to the present invention, illustrating an upper half of the lens in a zoom-wide mode and a lower half of the lens in a zoom-tele mode.
Figure 2:
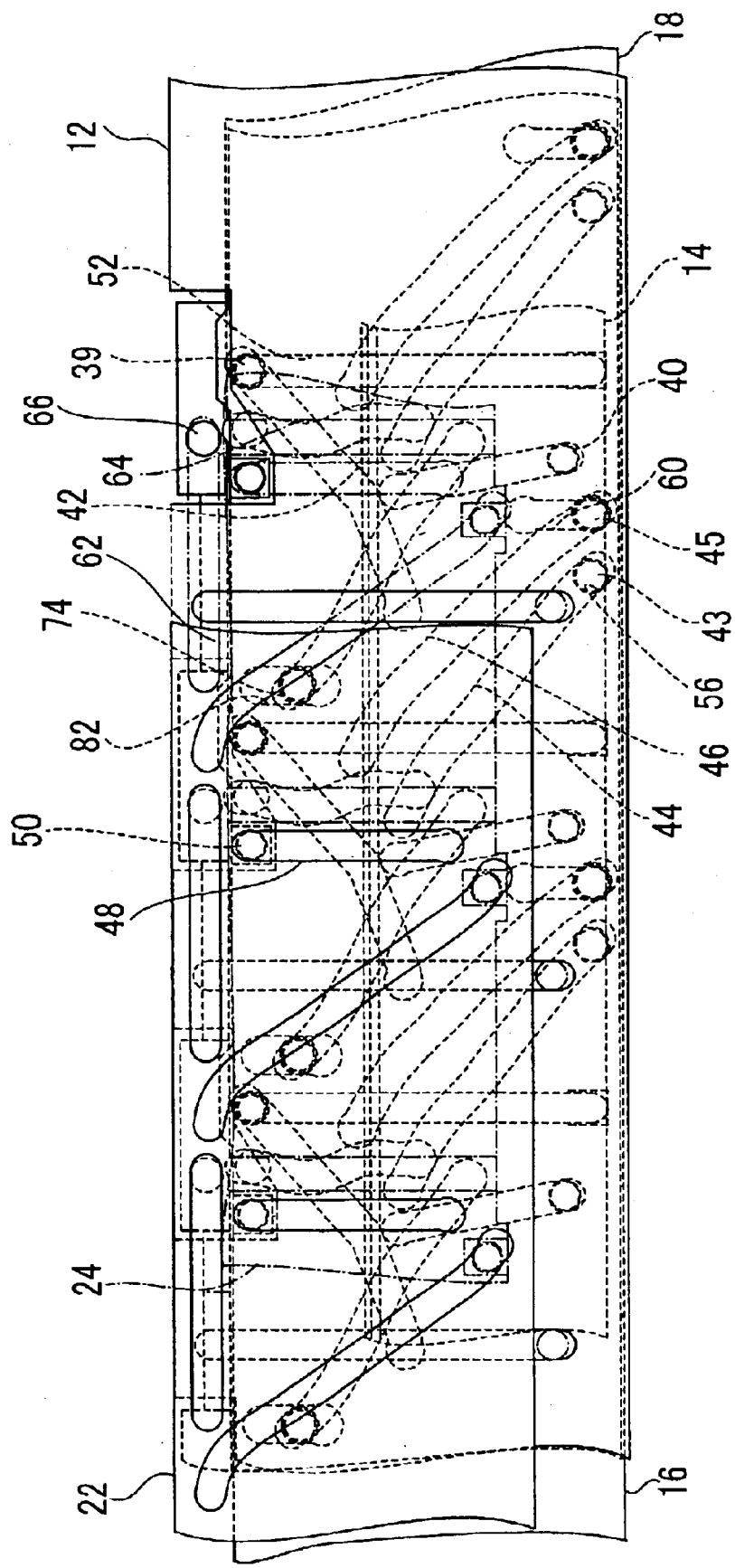
FIG. 2 is an exploded view of a zooming mechanism, showing the first embodiment of the high zoom ratio lens in the zoom-wide.
Figure 3:
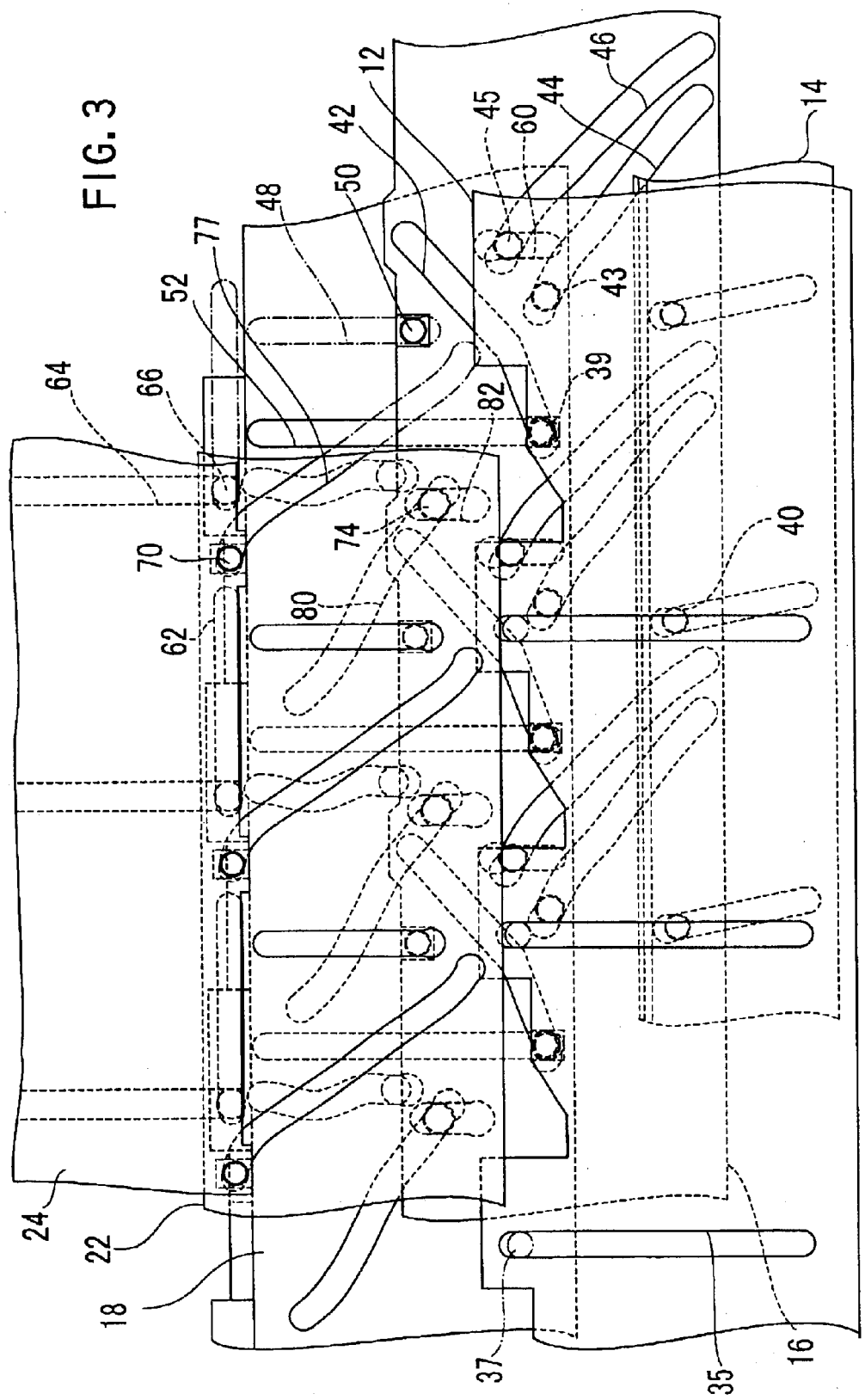
FIG. 3 is an exploded view of a zooming mechanism, showing the first embodiment of the high zoom ratio lens in the zoom-tele mode.
Figure 4:
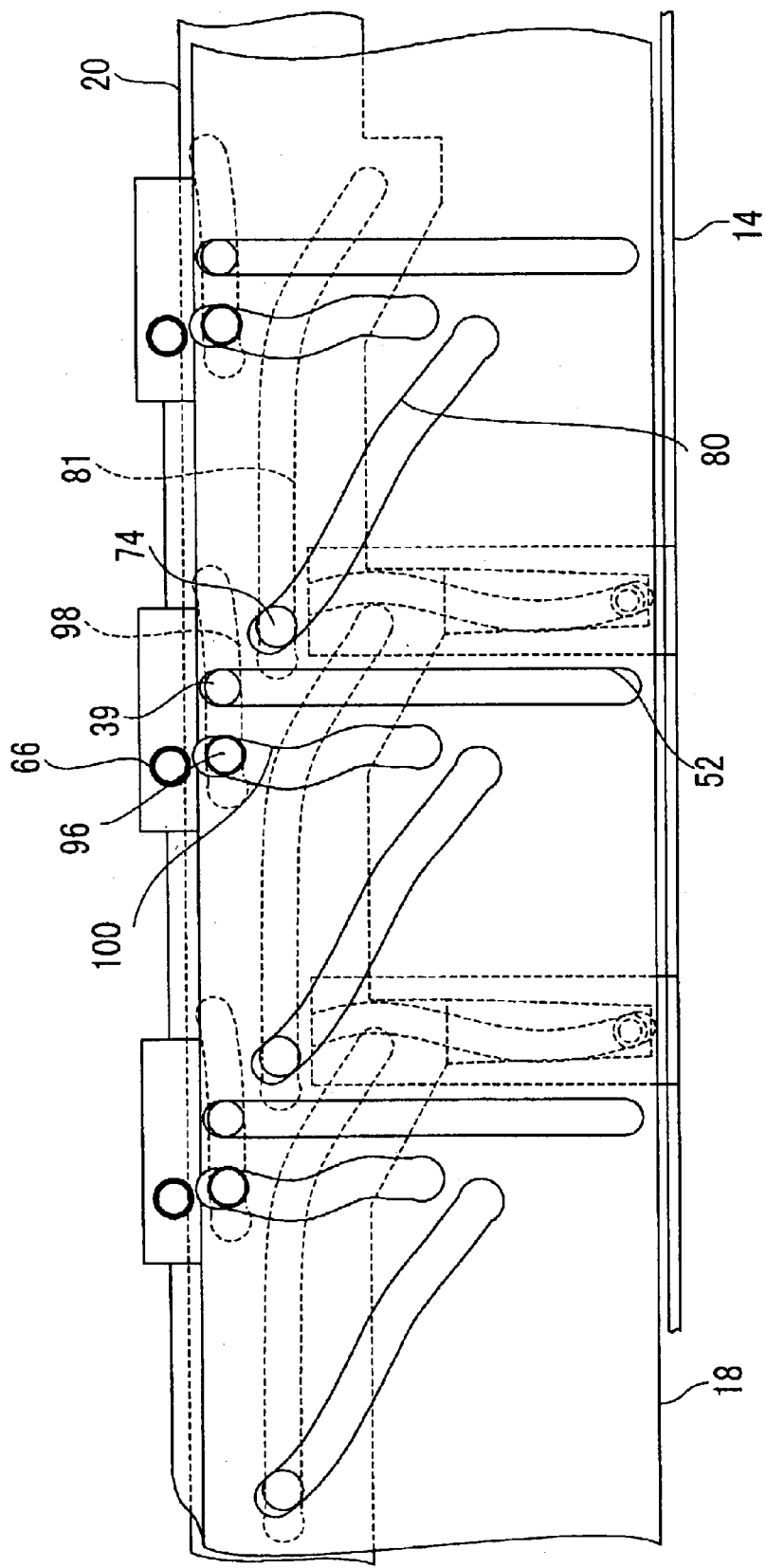
FIG. 4 is an exploded view of a focusing mechanism, showing the first embodiment of the high zoom ratio lens in the zoom-wide mode.

A first preferred embodiment of a high zoom ratio lens according to the present invention, which is 28 mm to 300 mm in focal length and 3.5 to 6.3 in F number, will now be described with reference to the drawings. FIG. 1 is a sectional view illustrating the first embodiment of the high zoom ratio lens where, for convenience, an upper half of the lens is in a zoom-wide mode while a lower half of the lens is in a zoom-tele mode. FIG. 2 is an exploded view of a zooming mechanism when the high zoom ratio lens is in the zoom-wide mode. FIG. 3 is an exploded view of the zooming mechanism when the high zoom ratio lens is in the zoom-tele mode. FIG. 4 is an exploded view of a focusing mechanism when the high zoom ratio lens is in the zoom-wide mode. FIG. 5 is an exploded view of the focusing mechanism when the high zoom ratio lens is in the zoom-tele mode.

The first preferred embodiment, or namely, a high zoom ratio lens 1 is comprised, as can be seen in FIGS. 1 and 2, of four groups of lenses; a first group A having a focal length of approximately +97 mm, a second group B having a focal length of approximately −15 mm, a third group C having a focal length of approximately +43 mm, and a fourth group D having a focal length of approximately +69 mm.

Barrel Assembly and its Components and Arrangement

Referring to FIG. 1, barrel components of the high zoom ratio lens 1 are assembled in a telescopic structure, having a fixed barrel 12 secured to a lens mount 10 that is to be attached to a camera body (not shown), an auxiliary zoom ring 14 positioned within the fixed barrel 12, a first cam barrel 16 positioned inside the ring 14, a linear barrel 18 positioned inside the first cam barrel 16, and a focus cam barrel 20 positioned inside the linear barrel 18.

The fixed barrel 12 is superposed on its outside with a second cam barrel 22, which is superposed on its outside with a frame 24 holding and sliding the first group A of lenses, which is further superposed on its outside with an outer barrel 26 preventing the frame 24 from being exposed. Outside the outer barrel 26, there are provided a focus ring 28 and a zoom ring 30 manipulatable for focusing and zooming, respectively.

Zooming Mechanism

Referring to FIGS. 2 and 3, a stud 39 is secured to the fixed barrel 12, having its distal stalk end faced inward, to guide the first cam barrel. In an outer surface of the fixed barrel 12, there is provided a vertical guide cam 35 fitting on a stud 37 that is fixed to the outer barrel 26.

The first cam barrel 16 is coupled to the auxiliary zoom ring 14 by an auxiliary zoom stud 40, and a rotation of the zoom ring 30 is transmitted to the first cam barrel 16. The first cam barrel 16 is provided with a first cam barrel guide cam 42 fitting on the guide stud 39 to move the first cam barrel 16 in a direction along an optical axis, a guide cam 44 fitting on a stud 43 guiding the third group of lenses, and a guide cam 46 fitting on a stud 45 guiding the fourth group of lenses. The first cam barrel 16 has an auxiliary stud 50 in a position ahead of the fixed barrel 12 or opposed to the lens mount 10, and the stud 50 has its distal stalk end faced inward and cooperatively aids a cam motion of the second cam barrel. The stud 50 is fitted in a vertical guide groove 48 provided in the second cam barrel 22.

The linear barrel 18 is provided with a vertical guide groove 52 fitting on the guide stud 39 to guide the first cam barrel, a hole 56 fitting on the stud 43 to guide the third group of lenses, and a vertical guide hole 60 through which the stud 45 extends to guide the fourth group of lenses. The linear barrel 18 has a stud 66 in a position ahead of the fixed barrel 12, and the stud 66 has its distal stalk end faced inward and guides the frame that holds and slides the first group of lenses. The stud 66 extends through a longitudinal guide hole 62 defined in the second cam barrel 22 and is fitted in a vertical groove 64 that is used to guide the frame 24 holding and sliding the first group of lenses.

A focus cam 81 in the focus cam barrel 20 is fitted on a stud 74 in relation with the second group of lenses. The stud 74 is secured to a frame 72 that is positioned inside the focus cam barrel 20 to hold and slide the second group of lenses. The stud 74 is fitted in both of a guide cam 80 provided in the linear barrel 18 to guide the second group of lenses and a vertical groove 82 used to guide the first cam barrel 16.

In an outer surface of the second cam barrel 22, there is provided a guide cam 77 that is fitted on a stud 70 to guide the first group of lenses, and the stud 70 is secured to the frame 24 to slide the first group of lenses along with the same.

For an operation of the zooming mechanism, the zoom ring 30 is revolved to rotate the auxiliary ring 14. A rotation of the ring 14 is transmitted to the first cam barrel 16 by the auxiliary stud 40. As the first cam barrel 16 is rotated, the first cam barrel guide cam 42 and the first cam barrel guide stud 39 fitted therein cause the first cam barrel 16 to move in the direction along the optical axis. As the first cam barrel 16 is rotated, the linear barrel 18 inhibited from rotating by the first cam barrel guide stud 39 is forced to move in the direction along the optical axis by the guide cam 44 and the stud 43 fitted therein.

Since the stud 70 is fitted in the guide cam 77, the frame 24 holding the first group A of lenses is moved in the direction along the optical axis as the rotation of the first cam barrel 16 is transmitted to the second cam barrel 22. Since the frame 24 is supported by the second cam barrel 22, movement in the direction along the optical axis of the second cam barrel 22 along with the linear barrel 18 also causes the frame 24 supporting the first group A of lenses to move in the same direction.

The stud 74 secured to the frame 72 is fitted in the focus cam 81 in the focus cam barrel 20, the guide cam 80 in the linear barrel 18, and the vertical groove 82 in the first cam barrel 16. Thus, the rotation of the first cam barrel 16 causes the stud 74 to move in the direction along the optical axis while rotating about the same, and further causes the focus cam barrel 20 to move along the optical axis without rotating. The focus cam barrel 20 moving in parallel with the optical axis is followed by the second group B of lenses supported thereon.

The third group C of lenses, which are integrated in unity with,the linear barrel 18 by the stud 43, move in the direction along the optical axis.

The fourth group D of lenses are moved along the optical axis by the guide stud 45 that is fitted in both the guide cam 46 in the first cam barrel 16 and the vertical hole 60 in the linear barrel 18.

Focusing Mechanism

Primarily referring to FIGS. 4 and 5, the focus ring 28 is coupled to the focus cam barrel 20 by elements such as an auxiliary focus ring 95, and the rotation of the focus ring 28 is transmitted to the focus cam barrel 20. A stud 96, which is secured to a frame 94 holding the second group of lenses, is fitted in both of a focus cam barrel compensation cam 98 in the focus cam barrel 20 and a linear barrel compensation cam 100 in the. linear barrel 18.

For an operation of the focusing mechanism, the rotation of the focus ring 28 revolves the focus cam barrel 20. As the focus cam barrel 20 revolves, the static stud 74 fitted in the focus cam 81 and the stud 96 fitted in both the focus cam barrel compensation cam 98 and the linear barrel compensation cam 100 enable the second group B of lenses to rotate and simultaneously move along the optical axis for focusing.

Embodiment 2

A second preferred embodiment of the high zoom ratio lens will now be described. Although a high zoom ratio lens 200 will be explained in conjunction with FIG. 6, like reference numerals denote the similar elements to the above-mentioned first embodiment, and explanation about them is omitted. In the high zoom ratio lens 200, a stud 202 coupled to the third group C of lenses is fitted in both of a vertical guide hole 304 in the linear barrel 18 and a cam 206 in the first cam barrel 16. The first cam barrel 16 is also provided with a linear barrel guide cam 212 fitting on an auxiliary stud 210 that is secured to the linear barrel 18.

For an operation of the high zoom ratio lens 200, a rotation of the zoom ring 30 revolves the auxiliary zoom ring 14. The revolution of the ring 14 is transmitted to the first cam barrel 16 by the auxiliary stud 40. As the first cam barrel 16 is rotated, the first cam barrel guide cam 42 and the stud 39 fitted therein causes the first cam barrel 16 to move in a direction of the optical axis. Also, upon the rotation of the first cam barrel 16, the guide cam 212 in the first cam barrel 16 and the auxiliary stud 210 fitted therein enable the linear barrel 18 to move in the direction along the optical axis.

The rotation simultaneous with the linear movement along the optical axis by the first cam barrel 16 and the linear movement in the same direction by the linear barrel 18 force the stud 202 fitted in both the vertical guide hole 204 in the linear barrel 18 and the cam 206 to move in parallel with the optical axis, and this results in the third group C of lenses to move in the same direction.

As has been described, a high zoom ratio lens according to the present invention is advantageously configured so that the number of required barrel components or the number of elements of a telescopic barrel assembly is reduced to accordingly decrease the outermost diameter of the barrel assembly and to make it light-weighted.

Also, the high zoom ratio lens of the present invention may further reduce a longitudinal dimension of the barrel assembly when it is compacted the most or when a camera is out of use, for example, so as to advantageously shift the first group of lenses in a relatively greater forward stride.

Furthermore, in accordance with the present invention, a close-up distance from the front-end of the high zoom ratio lens to an object can be further reduced.

What is claimed is:

1. A high zoom ratio lens, comprising four groups of lenses, a fixed barrel, a first cam barrel disposed inside the fixed barrel, a linear barrel disposed inside the first cam barrel, a focusing cam disposed inside the linear barrel, and a second cam barrel disposed outside the fixed barrel and rotatably connected to the first cam barrel;

first one of the groups of lenses being moved for zooming by means of a first cam provided in the second cam barrel;

second one of the groups of lenses serving as a focusing lens and being moved for zooming by means of a second—A cam provided in the linear barrel;

at least either third or fourth one of the groups of lenses being moved for zooming by means of a cam provided in the first cam barrel; and the second group of lenses being moved for focusing by means of a second—B cam provided in the focusing cam.

2. A high zoom ratio lens according to claim 1, wherein the linear barrel is moved for zooming by means of a guide stud provided in the first cam barrel, the third group of lenses are fixed to the linear barrel, and the fourth group of lenses are moved for zooming by means of a fourth cam provided in the first cam barrel.

3. A high zoom ratio lens according to claim 1, wherein both the third and fourth groups of lenses are moved for zooming respectively by means of third and fourth cams provided in the first cam barrel.

4. A high zoom ratio lens according to claim 1, wherein the second group of lenses are moved for focusing by means of an engagement of the second—A cam in the linear cam with the second—B cam in the focusing cam.

5. A high zoom ratio lens according to claim 1, wherein a displacement of the linear barrel during the zooming is reduced down to 40% to 60% of a displacement of the first group of lenses for zooming.

* * * * *